United States Patent
Gabriel

(10) Patent No.: US 7,058,536 B2
(45) Date of Patent: Jun. 6, 2006

(54) METHOD AND DEVICE FOR PERFORMING A FUNCTIONALITY TEST OF A TECHNICAL DEVICE

(75) Inventor: Günther Ewald Gabriel, Würzburg (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 177 days.

(21) Appl. No.: 10/467,332

(22) PCT Filed: Feb. 21, 2002

(86) PCT No.: PCT/DE02/00641

§ 371 (c)(1),
(2), (4) Date: Feb. 26, 2004

(87) PCT Pub. No.: WO02/067064

PCT Pub. Date: Aug. 29, 2002

(65) Prior Publication Data

US 2005/0210385 A1    Sep. 22, 2005

(30) Foreign Application Priority Data

Feb. 21, 2001   (DE) ................ 101 08 233

(51) Int. Cl.
*G06F 19/00* (2006.01)
(52) U.S. Cl. .......... 702/123; 702/117; 702/120; 702/123; 324/500; 324/765; 714/30; 714/718; 358/500; 358/406
(58) Field of Classification Search ........ 702/117–120, 702/123; 324/500, 765; 714/30, 718; 358/500, 358/406
See application file for complete search history.

(56) References Cited

U.S. PATENT DOCUMENTS

| | | | | |
|---|---|---|---|---|
| 4,615,029 A | * | 9/1986 | Hu et al. ................. | 370/449 |
| 5,111,402 A | * | 5/1992 | Brooks et al. ............ | 701/35 |
| 5,130,936 A | * | 7/1992 | Sheppard et al. .......... | 702/123 |
| 5,224,101 A | * | 6/1993 | Popyack, Jr. ............ | 714/718 |
| 5,588,109 A | | 12/1996 | Dickinson et al. | |
| 5,831,991 A | * | 11/1998 | Miller et al. ............ | 714/724 |
| 6,208,948 B1 | | 3/2001 | Klingler et al. | |

FOREIGN PATENT DOCUMENTS

| | | |
|---|---|---|
| DE | 31 00 451 A1 | 1/1982 |
| DE | 36 02 171 A1 | 7/1987 |
| DE | 197 13 471 A1 | 9/1998 |
| DE | 197 25 916 A1 | 1/1999 |
| DE | 195 22 937 C2 | 9/1999 |
| DE | 199 33 924 A1 | 11/2000 |

OTHER PUBLICATIONS

May, 'A Flexible VHDL Test Bench Architecture', 1992, IEEE Publication, pp. 979-985.*

* cited by examiner

*Primary Examiner*—Marc S. Hoff
*Assistant Examiner*—Elias Desta
(74) *Attorney, Agent, or Firm*—Jones Tullar & Cooper PC

(57) ABSTRACT

A method for carrying out the functional test of a technical unit utilizes several steps. A test program is created by the selection and storage of control commands held in a data bank. The test program is created depending on the unit for checking. The check command is input into a controller. The control commands are then output to a unit in a defined sequence. The information received back from the unit is then displayed.

24 Claims, 3 Drawing Sheets

FIG. 2

Message Definition DPR-Koppler KT97/98

| | | | | | | | Residual Data Memory |
|---|---|---|---|---|---|---|---|
| Description: | Operation of the color zone module (entire ink reservoir) | | | | | | SPS: ☐ |
| From: | DPR Coupler | | | | | | Control Console: ☐ |
| To: | SPS Print Unit | | | | | | During refresh SPS transmits |
| Use: | ☐ Remarks: | | | | | | global: ☐  SKS: ☐ |
| Type: | Command Message | Dec.: | Print Unit/Print Group | | | | Control Console: ☐  InfoSys: ☐ |
| Info1_2: | Modes Color Zones | Ort1: | Variable: Print Group 1.4 | | | | furthermore: |
| Info3: | Not Defined | Ort2: | All Plates or... Not Defined | | | | During Refresh Coupler Sends |
| Info4: | Not Defined | Ort3: | Not Defined | | | | global: ☑  With Date Change |
| | | | | | | | furthermore: |

| Ser. No. | 1 | Data Type: | Bit Strip(Word) | | | | |
|---|---|---|---|---|---|---|---|
| | LB7: | LB6: | LB5: | LB4: | LB3: | LB2: | LB1: | LB0: |
| | All Color Zones 100% | All Color Zones Closed | Power OFF | Power ON | Positioning Blocked | Positioning Open | Send Actual Values Off | Send Actual Values On |
| | HB7: | HB6: | HB5: | HB4: | HB3: | HB2: | HB1: | HB0: |
| | Set to Desired Values | All Color Zones to Pre-inking | | | | | | |

Data Set: 1  2  of 3

Data Set: 13  of 538   Comments

METHOD AND DEVICE FOR PERFORMING A FUNCTIONALITY TEST OF A TECHNICAL DEVICE

FIELD OF THE INVENTION

The present invention is directed to a method and to a device for performing a functionality test, as well as to the functionality test of a technical unit of a printing press. A testing program is prepared by selecting control commands from a data bank. A display panel can display the control commands.

BACKGROUND OF THE INVENTION

At present, test control consoles are employed for the functionality testing of various units, such as, for example, printing presses or parts thereof, which test control consoles make it possible for an operator, identified as a consumer, to control the individual functions of the unit to be tested and to check whether the unit reacts in the intended manner to the settings input at the test control console. Customarily the settings required for a complete functionality test are listed in a test protocol, in which test protocol the consumer can enter, if desired, the reactions of the unit to the settings performed and reported by the test control console in order to document, in this way, the correct or the incorrect functioning of the unit. This procedure is lengthy, time-consuming and contains uncertainties which never completely eliminate the possibility that the consumer does not make erroneous settings, does not correctly enter results in the protocol, or omits test steps.

DE 197 25 916 A1 describes a diagnostic device for electrically controlled systems, in which additional libraries are added to a diagnostic program. The automatic running of several functions and the input of plain language are not disclosed.

DE 195 22 937 C2 discloses a diagnostic system for a motor vehicle with a "fixed" diagnostic program. No plain language input is provided.

A testing device for an electro-medical apparatus is known from DE 36 02 171 A1. Access to a data bank for preparing a test program is not possible.

U.S. Pat. No. 5,588,109 discloses a method and a device for the remote diagnosis of units already placed in an installation by the customer. A unit to be diagnosed can be selected from a predetermined number. Parameters are assigned to the unit, whose measured values are then detected by the device by use of a remote diagnosis and are shown on a display. A user can either make notes in a "memo field", or can select further parameters to be measured from a predetermined number of parameters and display them. By use of a further tool, the user can select a testing program from a predetermined number, which has a fixed sequence of steps.

SUMMARY OF THE INVENTION

The object of the present invention is directed to providing a method and a device for performing a functionality test, as well as to a functionality test of a technical unit.

In accordance with the present invention, this object is attained by the provision of a method for performing a functionality test of a technical unit. A testing program is prepared using control commands selected from a larger group of control commands which are stored in a data bank. The testing program is prepared as a function of the unit to be tested. The testing program can be transferred to a control unit. The technical unit can be connected to the control unit and can be tested. A bus may be used for transmitting the control commands, with the bus being the same as the type of bus which the technical unit uses to communicate with other components of a finished printing press. A display screen is used to display input masks that represent control commands in text form, or as graphic symbols. A memory element stores the control commands selected by the input masks, as a function of the unit to be tested, as a testing program.

The advantages to be gained by the present invention lie, in particular, in that it assures a complete and correct performance of the functionality test with only little outlay for time and work. Since the control unit includes a complete testing program, the accidental omission of individual test steps is not possible. A time savings results, inter alia, from the fact that the control unit can immediately issue a command, which is already known to the control unit from the testing program, to the unit to be tested as soon as the previous test step is completed. It is thus not necessary to wait until an operator has made the settings required for performing the next steps.

In order to be able to generate a complete and a dependable protocol regarding the results of the individual test steps, it is useful for the control unit to have a third interface for issuing acknowledgement information which it has received from the unit, in response to an issued control command. The totality of the acknowledgement information can be considered to be a testing protocol, by the use of which, the correct performance of the functionality test can be verified at any desired later time.

To make this later test easier, it is useful not only if the acknowledgement information can be issued via this third interface, but moreover also the issuance of all control commands issued to the unit via the first interface, which have resulted in the respective acknowledgements. In this way, it is possible to provide proof, beyond all doubt, regarding the performance of every individual step of the test program.

For creating the protocol, a writing device for a data carrier, which cannot be overwritten, is preferably connected to the third interface. In the simplest embodiment, this writing device can be a printer. For storing extensive protocols in a space-saving manner, the employment of a CD burner can also be considered.

To make it possible for a user to follow the course of the testing program, the control unit can be equipped with a display screen for use in displaying control commands issued to the unit, if desired also inclusive of the parameters of such control commands. In the simplest configuration, this control unit can be realized as a computer, and in particular as an inexpensive workplace computer, which computer communicates with the technical unit to be tested via a bus.

In order to prevent any tampering with the progress of the testing program by the user, the control unit may be configured so that it does not have any interface for use for entering control commands by a user. This can be realized, in the case of a control unit in the form of a workplace computer, if the conversion of the testing program into commands, which commands can be performed by the unit, and the issuance of such commands, is performed under the control of a control program, which control program does not accept any commands from a user during the running of the testing program.

It is also possible to provide the user the possibility, within reason, of affecting the control commands sent to the unit, in particular if these control commands are also entered into the protocol to be prepared. To make the fixing of such control commands, or their parameters, easier for the user, it is possible to provide a memory element for storing input masks, each of which input masks contains input fields for specifying a control command, or the parameters of a control command specified by the user.

BRIEF DESCRIPTION OF THE DRAWINGS

A preferred embodiment of the present invention is represented in the drawings and will be described in greater detail in what follows.

Shown are in.

DESCRIPTION OF THE PREFERRED EMBODIMENT

Figure 1:
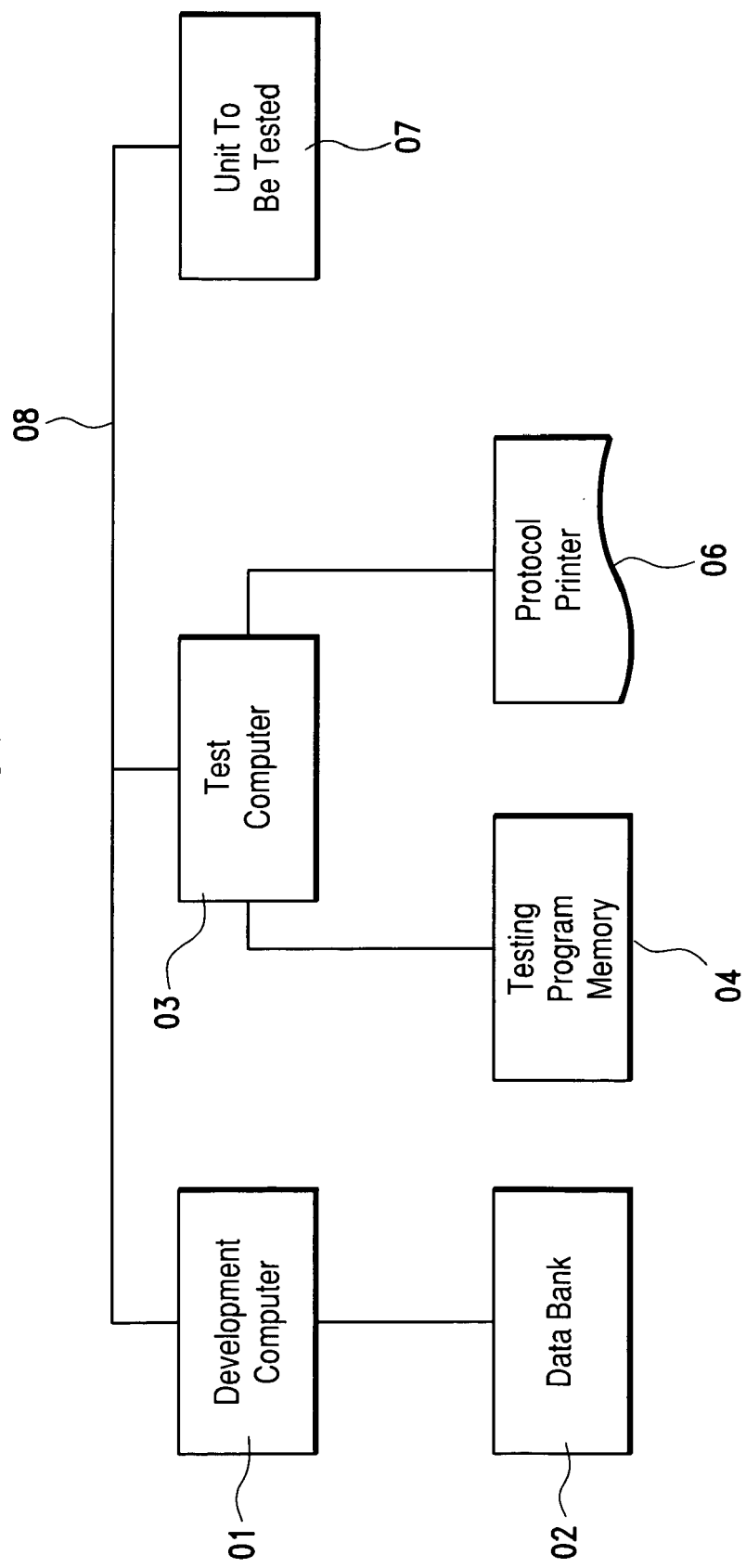
FIG. 1, a block diagram of an integrated system for developing a testing program and for performing it on a unit to be tested, in accordance with the present invention, in FIG. 2, an example of a graphic representation of a command which can be performed by the unit, and in FIG. 3, a graphic representation of the steps of a testing program which makes it possible for a user to follow the performance of the testing program by the use of the device in accordance with the present invention.

The development and testing system represented in FIG. 1, in accordance with the present invention, contains a first computer, identified as a development computer 01, which is connected to a data bank 02, a second computer identified as a test computer 03, which is connected to a testing program memory 04 and to a protocol printer 06, and a unit 07 to be tested.

The unit 07 to be tested, is part of a printing press, and can be, for example, a printing unit, a folding apparatus, a roll changer, a draw-in device, a cooling group, a dryer, a superstructure with guide rollers and turning bars, a sheet feeder, a sheet delivery device, a sheet conveying installation, a turning installation, or the like, or can be a component of a unit 07 to be tested, for example an inking unit, a dampening unit, and the like.

The development computer 01, the test computer 03 and the unit 07 to be tested are each equipped with suitable interfaces in order to be able to communicate with each other via a common bus 08. The common bus 08 is of the same type as a suitable bus, not shown, through the one via which the unit 07, if it is a part of a printing press would, in a finished printing press, communicate with other components of the finished printing press, for example for receiving control commands from a central control unit and for providing acknowledgments regarding the execution of a control command, of a set of parameters, and the like to the control unit or to other components.

The data bank 02 contains a data set whose elements each correspond to one of a plurality of control commands which the unit 07, or which other components of the printing press are able to process.

A programmer, during the development of a testing program for a given unit 07, sequentially selects elements of the data set which are intended to form control commands of the testing program and which are to be sequentially executed.

Each element of the data set consists of a plurality of data fields, as well as of information which fixes the type of the display of the individual data fields on a display screen of the development computer 01. An example for such a display, which display is shown to the programmer, after the selection of an element of the data set, is represented in FIG. 2. Consecutive numbers, in this example the number 17, is assigned to each one of the elements of the data set. An identification of the command, in text form, in this case "operation of the color zone modules", the designation 12 of a component of the printing press which is the sender of the report, and the designation 13 of a receiver of the control command, are shown in a first partial window 11. It is also within the scope of the preset invention to represent the control commands as graphic symbols.

Depending on the importance of a particular control command, it is possible to assign various parameters to it, which can assume various values. A second partial window 14 is divided into a plurality of fields 16, each of which fields 16 is assigned to one of these parameters, contains information regarding the importance of the assigned parameter, and on which field a programmer can write a selected value of the parameter. In the example of a command for the control of the color zone module of an inking system, which is represented in FIG. 2, a total of 10 parameters, each of a width of one bit, is defined, each of which parameters can assume values of 0 or 1 as set or not set. In this case, the parameters are distributed over the bits LB0 to LB7 and HB6 to HB7 of two bytes. Here, a group of "n" parameters each is assigned to an operating property of the unit 07 to be tested, which can assume "n" values.

For example, the bits LB0, LB1 are used for activating or deactivating a testing mode of the ink color modules. The testing mode is distinguished in that the module cyclically transmits a plurality of internal measuring values, such as temperature, potentiometer voltages, and the like, which transmission would not be the case during normal operations of the module. The bits LB3, LB4 are used for switching the color zone module back and forth between a normal operational state and a stand-by state. By transmitting a command "operation of the color zone modules" with the bit LB5 set, the module can be switched into the stand-by state, in which state control commands addressed to it are not evaluated, with the exception of the inverse command "operation of the color zone modules" with the bit LB4 set.

In this case, n=4 different states are defined for the color zones of the module, to each of which different states a parameter bit is assigned: all color zones 100% open (LB7), all color zones closed (LB6), setting of all color zones to a nominal value determined in a previous control command (HB7), and setting all color zones to pre-inking (HB6). Of the parameter bits, which are all a part of a group of alternative parameters, such as for example LB6, LB7, HB6, HB7, only one can be selected at one time.

If none of the parameters of a group has been set, the property of the module, which can be affected by these parameters, remains unchanged in the course of performing the control command by the module. For example, to get the color zone module ready, by use of a single control command, to process control commands for releasing the positioning of the actuators and to set all color zones to the nominal value, a programmer therefore can select the fields LB4, LB2, HB7 in the partial window 14, whereupon the development computer 01 generates a testing program step with the control command "operation of the color zone modules" and an associated 16 bit parameter word of the hexadecimal value 8014, or the binary values 1000 0000 0001 0100.

The setting of other control commands of the testing program for other components of a printing press to be tested, can also take place in the same way as described above.

A testing program developed in this way as a sequence of control commands can now be transferred via the bus 08 to the testing program memory 04 of the testing computer 03.

The testing program can have the form of a data set which contains nothing more than the compilation of control commands to be issued by the testing computer 03 to the unit 07 to be tested, as well as their parameters and, if required, auxiliary information, whose function will be addressed at a later time. The conversion of this data set into commands transmitted to the unit is performed by a system program of the testing computer 03.

In general, the testing program can also be in the form of a program which is performed directly by the testing computer 03 for issuing the fixed control commands. However, the first mentioned case is assumed in the continued description, namely that the testing program substantially only includes the control commands intended for the unit and that it is performed under control of a system program of the testing computer 03.

After the testing program has been transferred to the testing program memory 04, the development computer 01 is no longer needed for further testing of the unit 07. The development computer 01 and the unit 07 to be tested do not communicate directly with each other via the bus 08. It is therefore possible and also is useful that, at an initial time, the testing computer 03 is only connected with the development computer 01 for transferring the testing program into the memory 04, and that, at a later time, the testing computer 03 is connected via a bus 08 of the same type with the unit 07 to be tested. The testing computer 03 can usefully be a portable computer, such as a laptop, for example, so that the testing program in a first network can be transferred to the memory 04 via the bus 08, and that actual testing of the unit 07 can be performed at any other arbitrary location in a second network via the bus 08.

It is, of course, possible to transfer the testing program in any arbitrary other way into the testing program memory 04, for example by writing the testing program on a data carrier at the development computer 01 and by reading the data carrier out at the testing computer 03. It is also conceivable for the development computer 01 and for the testing computer 03 to be the same device, which single device merely executes different programs at different times.

Figure 3:
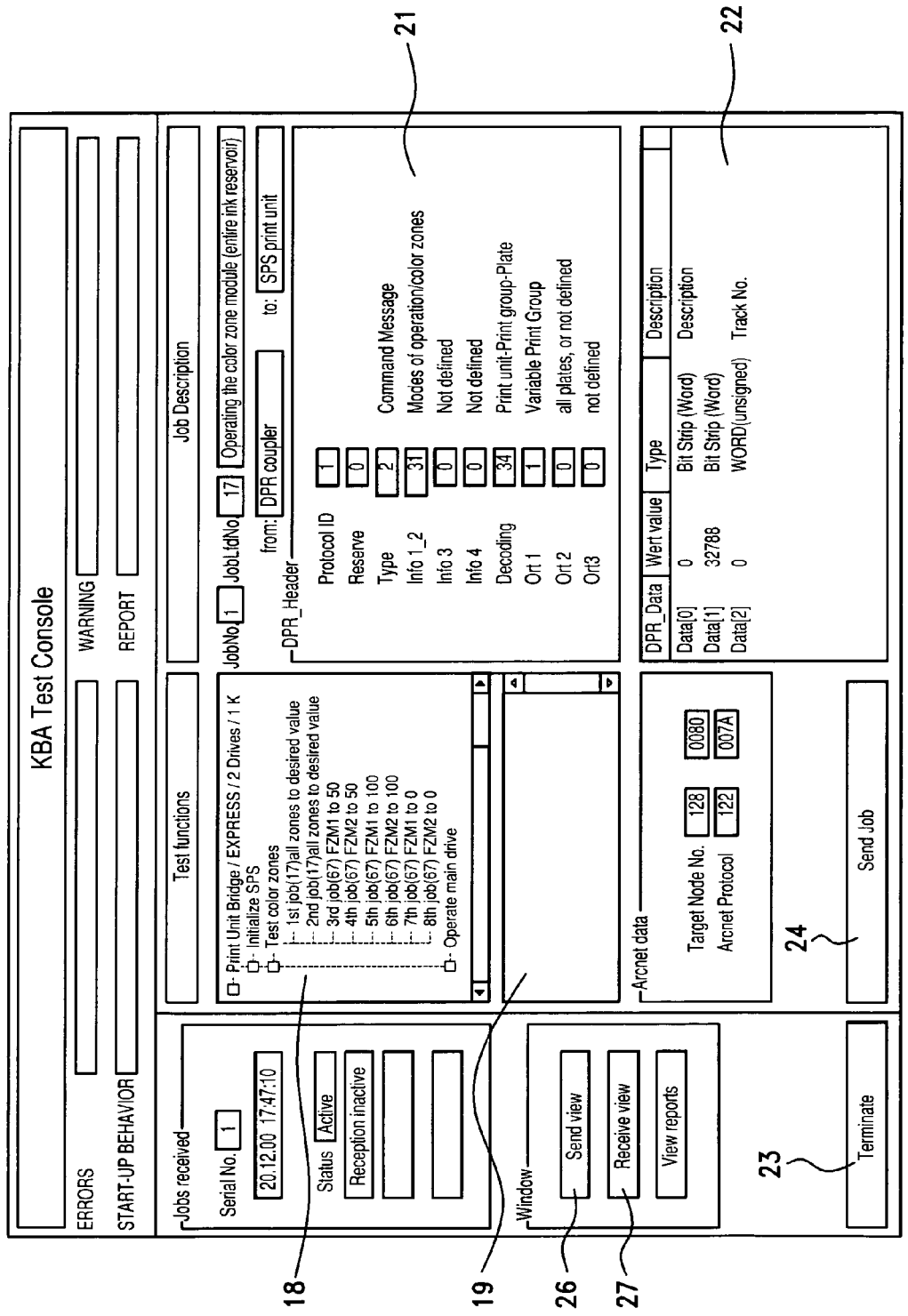

FIG. 3 shows the structure of an image appearing on a display screen, which is not represented, of the testing computer 03 in the course of processing the testing program entered into the testing program memory 04. The testing program is divided into a plurality of sections, each of which sections has been assigned a title, here "initialize SPS", "test color zones", "operate main drive unit", which sections are arranged in a tree structure in the partial window 18. These titles, as well as information regarding their hierarchical structuring required for generating the tree structure, are contained in the above mentioned auxiliary information.

At the stage of the performance of the testing program represented in FIG. 3, the testing computer 03 is in the process of performing the testing program "test color zones", to which end the individual control commands, or "jobs", of which the partial program is composed, are listed in the partial window 18. Only the titles of presently not performed program sections, such as "initialize SPS" and "operate main drive unit", are represented. The control command being executed at this time is represented inverted, i.e. as white print on a black background.

A partial window 19 can be used for displaying comments or instructions in text form, which can also be contained in the auxiliary information, synchronized with the running of the testing program, to a user of the testing program. In a plurality of named fields, a further partial window 21 shows a sequence of numerical values which, when transmitted in a fixed sequence on the bus 08 to the unit 07, constitute the control command represented inverted in the window 18. Parameters of the control command, here the decimal value 32788, for example, which corresponds to the above hexadecimal value 8014 in the above mentioned example, are represented in a partial window 22. Thus a user which lets the test computer 03 perform the control program can obtain a complete overview regarding the progress of the testing program by utilization of the display represented in FIG. 3.

By the use of a plurality of buttons 23, 24, 26, 27, the user has the ability to stop the testing program run, by using button 23, to manually trigger the transmission of a control command to the unit to be tested 07, by using button 24, or to switch the display of the status shown in FIG. 3, in which the sent commands are displayed, into a state wherein the acknowledgements received from the unit 07 are displayed, and vice versa, by using buttons 26, 27. An addition or removal of control commands, or a manipulation of their parameters, is not provided.

Acknowledgements received by the testing computer 03 from the unit to be tested 7, as a response to a transmitted control command, are output by the system program on a protocol printer 06 in the sequence of their arrival. On the basis of this testing program, and with a knowledge of the performed control program, it is easily and assuredly possible to prove, at a later time, that the functionality test has taken place with all required steps and correct parameters, and what results it has provided.

To make such a later test even more easily possible, it can be provided that not only the acknowledgement information sent by the unit 07 is output on the protocol printer 06, but also the control commands sent by the testing computer 03 to the unit 07, which had triggered the recorded acknowledgements are also output on the protocol printer 06.

If the system program completely records the control commands sent to the unit 07 on the printer 06, it is also possible, with this system program, to provide a possibility for a mask, of the type represented in FIG. 2, to be displayed on the testing computer 03, so that a user has the option, in this way, to insert additional testing commands, or to change the parameters of testing commands if the result delivered by the testing program make this desirable. Since these additional or modified commands, and the acknowledgements sent as a reaction thereto by the unit 07, are recorded on the printer 06, the reproducibility of the test process and the possibility of documenting its correct and complete performance is assured.

It is, of course, possible to employ any arbitrary other data recording device in place of the printer, by the use of which a recording, safe against later falsification, of the progress of the testing program, can be installed. For example, it is possible to employ a CD burner for recording the protocol on a CD-ROM which can only be written on once. Also conceivable is a recordation on any arbitrary data carriers which, per se, can be overwritten, for example any arbitrary magnetic data carrier which is protected by program-technological means, for example by a so-called digital signature, against subsequent falsification.

The functionality test of a printing unit can include the following steps, for example: turning the printing unit on and off, drive units of inking rollers, inking ductor, ink aspirator, dampening unit, dampening ductor, drive units of cylinders, circumferential, diagonal and axial registration of the rollers, locking devices for dressings on the cylinders, print-on and print-off of the cylinders, washing function of the inking unit and the cylinders, dampening fluid level control, adding of printing plates.

A device in accordance with the present invention may be characterized in that the unit to be tested 07 is embodied as a printing unit or as a folding apparatus or as a draw-in device or as a cooling group or as a dryer, or as a superstructure with guide rollers and turning bars, or a sheet feeder, or a sheet delivery device, or a sheet conveying installation, or a turning installation.

While preferred embodiments of a method and device for carrying out the functional check and functional checking of a technical unit, in accordance with the present invention, have been set forth fully and completely hereinabove, it will be apparent to one of skill in the art that a number of changes in, for example, the structure of the technical unit to be tested, the specific computer or computers used to conduct the tests, and the like, could be made without departing from the true spirit and scope of the present invention, which is accordingly to be limited only by the following claims.

What is claimed is:

1. A method for performing a functionality test of a technical unit including:
    providing a plurality of control commands stored in a data base;
    selecting control commands from said plurality of control commands as a function of a technical unit to be tested;
    storing said selected control commands;
    preparing a testing program for the technical unit using said stored, selected control commands;
    providing a control unit;
    transferring said testing program to said control unit;
    connecting said control unit with the technical unit to be tested;
    outputting said selected control commands to the technical unit in a defined sequence; and
    receiving and displaying acknowledgment information from the technical unit.

2. A method of performing a functionality test of a technical unit including:
    providing a plurality of control commands stored in a data base;
    selecting control commands from said plurality of control commands as a function of a technical unit to be tested;
    storing said selected control commands;
    preparing a testing program for the technical unit using said stored, selected control commands;
    providing a control unit;
    transferring said testing program to said control unit;
    providing a bus identical to a bus usable with said technical unit for communicating with other components of a finished printing press;
    outputting said selected control commands to the technical unit using said bus in a defined sequence; and
    receiving and displaying acknowledgment information from the technical unit.

3. The method of claim 1 further including preparing a recording of said acknowledgment information received from the technical unit.

4. The method of claim 2 further including preparing a recording of said acknowledgment information received from the technical unit.

5. The method of claim 3 further including all of said selected control commands in said recording.

6. The method of claim 4 further including all of said selected control commands in said recording.

7. The method of claim 1 further including represented said control commands in one of text form and graphic symbols.

8. The method of claim 2 further including represented said control commands in one of text form and graphic symbols.

9. The method of claim 1 further including displaying said control commands during performance of said testing program.

10. The method of claim 2 further including displaying said control commands during performance of said testing program.

11. The method of claim 1 further including providing a bus and using said bus for transmitting said control commands of said testing program to said technical unit.

12. The method of claim 1 further including providing said testing program with only control commands intended for said technical unit.

13. The method of claim 2 further including providing said testing program with only control commands intended for said technical unit.

14. The method of claim 1 including testing at least one of the functions of the technical unit selected from the functions including:
    engaging and disengaging inking rollers, engaging and disengaging inking ductors, engaging and disengaging ink aspirators, engaging and disengaging dampening ductors, operating drive units of inking rollers, operating drive units of inking ductors, operating drive units of ink aspirators, operating drive units of dampening ductors, operating drive units of cylinders, operating drive units for circumferential registrations of cylinders, operating drive units for diagonal registrations of cylinders, operating drive units for axial registrations of cylinders, operating locking devices of dressings on cylinders, operating dampening water control, and the addition of printing plates.

15. A device for functionality testing of a technical unit comprising:
    at least one displaying screen for displaying input masks;
    at least one memory unit;
    a control unit with a testing program, said input masks representing a plurality of control commands in one of text form and graphic symbols, said memory unit being adapted to store said control commands selected by said input masks, as a function of a unit to be tested, as a testing program, said testing program being prepared using one of a program different from said testing program and a development computer; and
    a first interface adapted to transmit control commands to said technical unit and to secure acknowledgment information from said technical unit, said first interface containing a second interface, said second interface being adapted for receiving said testing program, said testing program defining a plurality of control commands and their sequence, said second interface being adapted to output said control commands defined in said testing sequence via said first interface in a defined sequence.

16. The device of claim 15 further including a third interface adapted for outputting acknowledgment information received from said technical unit.

17. The device of claim 16 further wherein said third interface is adapted to output all of said control commands issued by said first interface.

18. The device of claim 17 further including a writing device for a data carrier, not able to be overwritten, connected to said third interface.

19. A device for functionality testing of a technical unit comprising:
  a first display screen for displaying input masks;
  a second display screen adapted to display control commands and parameters of control commands;
  at least one memory unit; and
  a control unit with a testing program, said input masks representing a plurality of said control commands in one of text form and graphic symbols, said memory unit being adapted to store said control commands selected by said input masks, as a function of a unit to be tested, as a testing program, said testing program being prepared using one of a program different from said testing program and a development computer.

20. The device of claim 15 wherein said memory unit stores said input masks.

21. The device of claim 15 further including a buffer memory adapted for the buffer memory adapted for the intermediate storage of not yet executed memory commands.

22. A device for functionality testing of a technical unit comprising:
  at least one displaying screen for displaying input masks;
  at least one memory unit; and
  a control unit with a testing program, said input masks representing a plurality of said control commands in one of text form and graphic symbols, said memory unit being adapted to store said control commands selected by said input masks, as a function of a unit to be tested, as a testing program, said testing program being prepared using one of a program different from said testing program and a development computer, said technical unit being a part of a printing press.

23. The device of claim 15 wherein said technical unit is a printing unit.

24. The device of claim 15 wherein said technical unit is a folding unit.

* * * * *